US012155082B2

(12) United States Patent
Miyawaki

(10) Patent No.: US 12,155,082 B2
(45) Date of Patent: Nov. 26, 2024

(54) ENERGY STORAGE APPARATUS

(71) Applicant: GS Yuasa International Ltd., Kyoto (JP)

(72) Inventor: Yasutaka Miyawaki, Kyoto (JP)

(73) Assignee: GS YUASA INTERNATIONAL LTD., Kyoto (JP)

(*) Notice: Subject to any disclaimer, the term of this patent is extended or adjusted under 35 U.S.C. 154(b) by 516 days.

(21) Appl. No.: 17/598,745

(22) PCT Filed: Mar. 18, 2020

(86) PCT No.: PCT/JP2020/012112
§ 371 (c)(1),
(2) Date: Sep. 27, 2021

(87) PCT Pub. No.: WO2020/196189
PCT Pub. Date: Oct. 1, 2020

(65) Prior Publication Data
US 2022/0149474 A1     May 12, 2022

(30) Foreign Application Priority Data
Mar. 28, 2019    (JP) .................................. 2019-063339

(51) Int. Cl.
*H01M 50/00*     (2021.01)
*H01M 10/0525*     (2010.01)
(Continued)

(52) U.S. Cl.
CPC ..... *H01M 50/296* (2021.01); *H01M 10/0525* (2013.01); *H01M 50/204* (2021.01);
(Continued)

(58) Field of Classification Search
CPC ............. H01M 50/291; H01M 50/204; H01M 50/296; H01M 10/0525
See application file for complete search history.

(56) References Cited

U.S. PATENT DOCUMENTS

2012/0003526 A1    1/2012   Kume et al.
2013/0260190 A1    10/2013   Sato
(Continued)

FOREIGN PATENT DOCUMENTS

EP    2 403 032 A1    1/2012
EP    3 012 884 A1    4/2016
(Continued)

OTHER PUBLICATIONS

Obergfaell et al, Holding-Down Means for Fixing Battery Cells in a Battery Submodule, and Battery Submodule, Jan. 2017, See the Abstract. (Year: 2017).*
(Continued)

*Primary Examiner* — Cynthia H Kelly
*Assistant Examiner* — Monique M Wills
(74) *Attorney, Agent, or Firm* — MCGINN I.P. LAW GROUP, PLLC

(57) ABSTRACT

An energy storage apparatus includes an energy storage device including a case, a spacer including a spacer main body portion arranged on a first side in a first direction of the energy storage device, and a side member including a side main body portion arranged on a first side in a second direction intersecting the first direction of the energy storage device.

20 Claims, 6 Drawing Sheets

(51) Int. Cl.
  *H01M 50/204*  (2021.01)
  *H01M 50/291*  (2021.01)
  *H01M 50/293*  (2021.01)
  *H01M 50/296*  (2021.01)
  *H01G 9/08*   (2006.01)
  *H01M 50/209*  (2021.01)
  *H01M 50/224*  (2021.01)
  *H01M 50/264*  (2021.01)
  *H01M 50/284*  (2021.01)

(52) U.S. Cl.
  CPC ....... H01M 50/291 (2021.01); H01M 50/293 (2021.01); *H01G 9/08* (2013.01); *H01M 50/209* (2021.01); *H01M 50/224* (2021.01); *H01M 50/264* (2021.01); *H01M 50/284* (2021.01)

(56) References Cited

U.S. PATENT DOCUMENTS

| | | |
|---|---|---|
| 2016/0149180 A1 | 5/2016 | Tokoo et al. |
| 2016/0218339 A1 | 7/2016 | Nishimori et al. |
| 2016/0365554 A1 | 12/2016 | Iqbal et al. |
| 2018/0123105 A1 | 5/2018 | Tokoo et al. |
| 2018/0351142 A1 | 12/2018 | Aoki et al. |
| 2020/0058912 A1 | 2/2020 | Kuramitsu et al. |
| 2021/0288363 A1 | 9/2021 | Okada et al. |

FOREIGN PATENT DOCUMENTS

| | | | |
|---|---|---|---|
| JP | 2007-299544 A | 11/2007 | |
| JP | 2008-235144 A | 10/2008 | |
| JP | 2010-153141 A | 7/2010 | |
| JP | 2012-119156 A | 6/2012 | |
| JP | 2012-256466 A | 12/2012 | |
| JP | 2013-073914 A | 4/2013 | |
| JP | WO2012/077216 A1 | 5/2014 | |
| JP | 2015-064959 A | 4/2015 | |
| JP | 2015-122265 A | 7/2015 | |
| JP | 2015-185415 A | 10/2015 | |
| JP | 2016-081599 A | 5/2016 | |
| JP | 2016-219185 A | 12/2016 | |
| JP | 2018-006348 A | 1/2018 | |
| JP | 2018-073705 A | 5/2018 | |
| JP | WO2017/057082 A1 | 7/2018 | |
| WO | WO-2017001119 A1 * | 1/2017 | ........ H01M 10/0481 |
| WO | WO 2017/057207 A1 | 4/2017 | |
| WO | WO 2018/042763 A1 | 3/2018 | |
| WO | WO 2018/061894 A1 | 4/2018 | |

OTHER PUBLICATIONS

International Search Report (ISR) (PCT Form PCT/ISA/210), in PCT/JP2020/012112, dated Jun. 16, 2020.

* cited by examiner (a)

(b)

US 12,155,082 B2

ENERGY STORAGE APPARATUS

TECHNICAL FIELD

The present invention relates to an energy storage apparatus including an energy storage device and a side member arranged on a side of the energy storage device.

BACKGROUND ART

Conventionally, an energy storage apparatus including an energy storage device and a side member arranged on a side of the energy storage device has been widely known. Patent Document 1 discloses a battery module (energy storage apparatus) including a plurality of battery cells (energy storage devices) and a pair of ladder frames (side members) arranged along a side surface of a plurality of the battery cells.

PRIOR ART DOCUMENTS

Patent Documents

Patent Document 1: JP-A-2012-256466

DISCLOSURE OF THE INVENTION

Problems to be Solved by the Invention

However, in the energy storage apparatus having the above-mentioned conventional configuration, there is a possibility that the energy storage device and the side member are short-circuited. In the energy storage apparatus (battery module) disclosed in Patent Document 1, an upper flange and a lower flange are formed on an upper edge and a lower edge of the side member (ladder frame) so as to sandwich a case of the energy storage device (battery cell) in a vertical direction. For this reason, the upper flange is arranged in the vicinity of an electrode terminal of the energy storage device, and there is a possibility that the upper flange and the electrode terminal of the energy storage device are short-circuited when there is vibration or impact from the outside. When the short circuit occurs between positive and negative electrode terminals via the upper flange, short circuit of the energy storage device occurs, which may cause an unsafe state. The inventor of the present application has found that in the energy storage apparatus having the above-described conventional configuration, there is a possibility that the energy storage device and the side member are short-circuited when there is vibration or impact from the outside as described above.

An object of the present invention is to provide an energy storage apparatus capable of reducing the possibility of occurrence of a short circuit between an energy storage device and a side member.

Means for Solving the Problems

An energy storage apparatus according to an aspect of the present invention includes an energy storage device including a case, a spacer including a spacer main body portion arranged on a first side in a first direction of the energy storage device, and a side member including a side main body portion arranged on a first side in a second direction intersecting the first direction of the energy storage device. The energy storage device includes an electrode terminal which protrudes from the case to a first side in a third direction which intersects the first direction and the second direction, the side member includes a first side protruding portion which protrudes from the side main body portion to a second side in the second direction toward the electrode terminal, and the spacer includes a first spacer protruding portion which is arranged between the electrode terminal and the first side protruding portion and protrudes from the spacer main body portion to the first side in the third direction further than at least one of the electrode terminal and the first side protruding portion.

The present invention can be realized not only as the energy storage apparatus but also as the spacer included in the energy storage apparatus.

Advantages of the Invention

According to the energy storage apparatus of the present invention, the possibility of occurrence of a short circuit between an energy storage device and a side member can be reduced.

MODE FOR CARRYING OUT THE INVENTION

Figure 1:
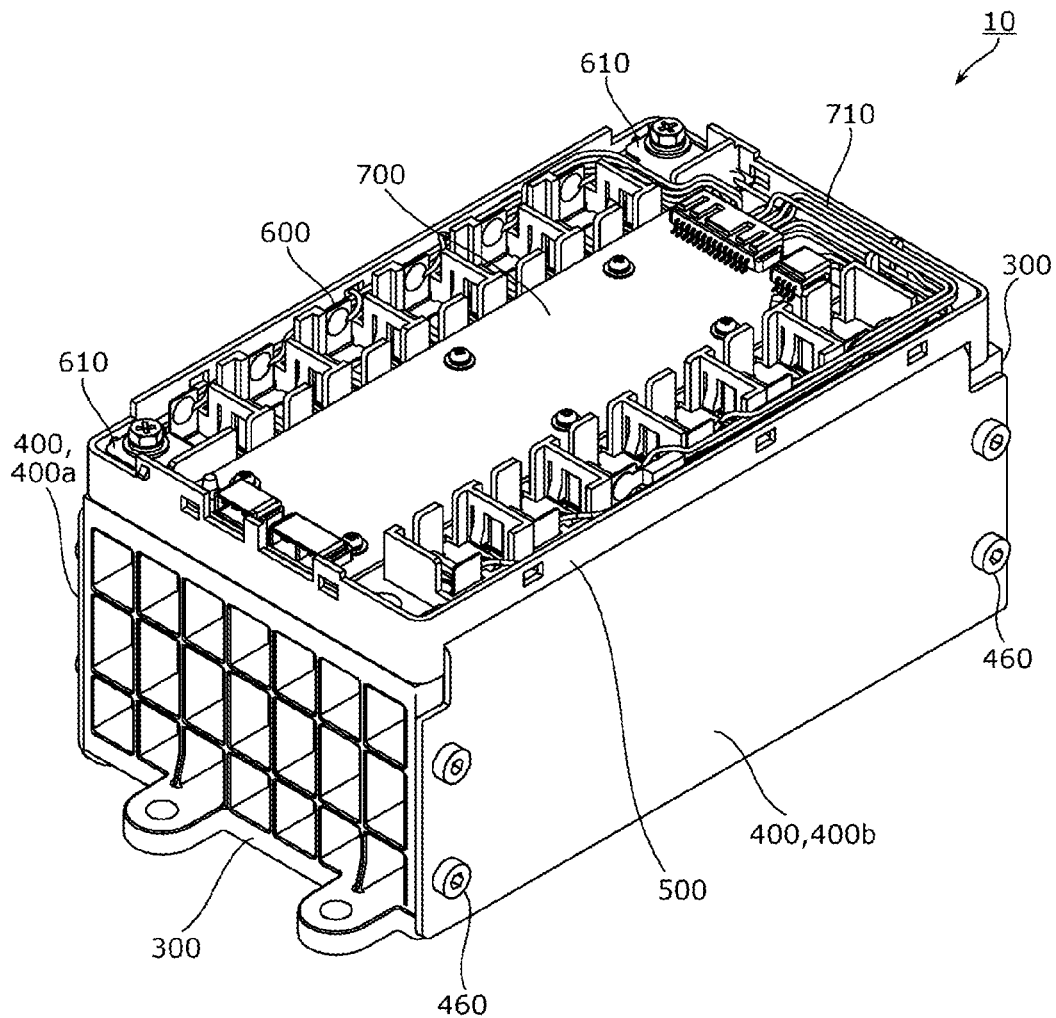
FIG. 1 is a perspective view showing an external appearance of an energy storage apparatus according to an embodiment.
Figure 1:
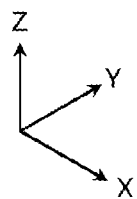

An energy storage apparatus according to an aspect of the present invention includes an energy storage device including a case, a spacer including a spacer main body portion arranged on a first side in a first direction of the energy storage device, and a side member including a side main body portion arranged on a first side in a second direction intersecting the first direction of the energy storage device. The energy storage device includes an electrode terminal which protrudes from the case to a first side in a third direction which intersects the first direction and the second direction, the side member includes a first side protruding portion which protrudes from the side main body portion to a second side in the second direction toward the electrode terminal, and the spacer includes a first spacer protruding portion which is arranged between the electrode terminal and the first side protruding portion and protrudes from the spacer main body portion to the first side in the third direction further than at least one of the electrode terminal and the first side protruding portion.

According to the above, in the energy storage apparatus, the side member includes the first side protruding portion which protrudes toward the electrode terminal of the energy storage device, and the spacer includes the first spacer protruding portion which protrudes further than at least one of the electrode terminal and the first side protruding portion between the electrode terminal and the first side protruding portion. Since the first side protruding portion of the side member is arranged so as to protrude toward the electrode terminal of the energy storage device as described above, there is a possibility that the electrode terminal and the first side protruding portion are short-circuited. For this reason, in the spacer, the first spacer protruding portion protruding further than at least one of the electrode terminal and the first side protruding portion is arranged between the electrode terminal and the first side protruding portion. In this manner, it is possible to improve electrical insulation property between the electrode terminal and the first side protruding portion. Accordingly, it is possible to reduce a possibility of occurrence of a short circuit between the energy storage device and the side member.

The side member may further include a second side protruding portion arranged so that the case is sandwiched between the second side protruding portion and the first side protruding portion, the second side protruding portion protruding from the side main body portion to the second side in the second direction, and the spacer may further include a second spacer protruding portion arranged on the second side in the second direction of the second side protruding portion, the second spacer protruding portion protruding from the spacer main body portion to a second side in the third direction.

According to the above, in the energy storage apparatus, the side member includes the second side protruding portion protruding to the second side in the second direction so that the case of the energy storage device is sandwiched between the second side protruding portion and the first side protruding portion, and the spacer includes the second spacer protruding portion on the second side in the second direction of the second side protruding portion. As described above, since the second side protruding portion of the side member is arranged so that the case of the energy storage device is sandwiched between the second side protruding portion and the first side protruding portion, there is a possibility that the case of the energy storage device and the second side protruding portions are short-circuited. For this reason, in the spacer, the second spacer protruding portion is arranged on the second side in the second direction of the second side protruding portion. In this manner, it is possible to improve electrical insulation property between the case and the second side protruding portion. Accordingly, it is possible to reduce a possibility of occurrence of a short circuit between the energy storage device and the side member.

The case may include a case protruding portion arranged on the second side in the third direction of the first side protruding portion, the case protruding portion protruding to the first side in the second direction.

According to the above, the case of the energy storage device includes the case protruding portion which protrudes to the first side in the second direction on the second side in the third direction of the first side protruding portion of the side member, so that the width of the energy storage device in the second direction is increased. Accordingly, a contact area between the energy storage device and the spacer increases, and the movement of the energy storage device in the third direction can be suppressed. In this manner, it is possible to reduce a possibility of occurrence of a short circuit between the energy storage device and the side member.

The spacer may further include a first abutting portion arranged between the first side protruding portion and the case protruding portion and on which the case protruding portion abuts in the third direction.

According to the above, the spacer includes, between the first side protruding portion of the side member and the case protruding portion of the case of the energy storage device, the first abutting portion on which the case protruding portion abuts in the third direction. As described above, the case protruding portion abuts on the first abutting portion of the spacer, so that the movement of the energy storage device in the third direction can be further suppressed. Accordingly, a possibility of occurrence of a short circuit between the energy storage device and the side member can be further reduced. Since the first abutting portion of the spacer is arranged between the first side protruding portion and the case protruding portion, it is possible to improve electrical insulation property between the first side protruding portion and the case protruding portion. Accordingly, it is possible to reduce a possibility of occurrence of a short circuit between the energy storage device and the side member.

The spacer further may include a second abutting portion arranged between the side main body portion and the case protruding portion and on which the case protruding portion abuts in the second direction.

According to the above, the spacer includes, between the side main body portion of the side member and the case protruding portion of the case of the energy storage device, the second abutting portion on which the case protruding portion abuts in the second direction. As described above, since the second abutting portion of the spacer is arranged between the side main body portion and the case protruding portion, it is possible to improve electrical insulation property between the side main body portion and the case protruding portion. Accordingly, it is possible to reduce a possibility of occurrence of a short circuit between the energy storage device and the side member. With the case protruding portion abutting on the second abutting portion of the spacer, it is possible to further suppress the movement of the energy storage device in the second direction.

Hereinafter, an energy storage apparatus according to an embodiment (and a modification example of the embodiment) of the present invention will be described with reference to the drawings. The embodiment described below illustrates a comprehensive or specific example. Numerical values, shapes, materials, constituent elements, arrangement positions and connection modes of the constituent elements, manufacturing processes, the order of the manufacturing processes, and the like shown in the embodiment below are merely examples, and are not intended to limit the present invention. In each drawing, dimensions and the like are not strictly illustrated.

In the description and drawings below, an arrangement direction of a pair of electrode terminals in one energy storage device, a facing direction of a pair of short side surfaces in a case of one energy storage device, an arrangement direction of a pair of side members, or an arrangement direction of the energy storage device and the side member is defined as an X-axis direction. An arrangement direction of a plurality of energy storage devices, an arrangement direction of a plurality of spacers, an arrangement direction of a pair of end members, an arrangement direction of the energy storage device, the spacer, and the end member, a facing direction of a pair of long side surfaces of the case of one energy storage device, or a thickness direction of the energy storage device, the spacer, or the end member is defined as a Y-axis direction. An arrangement direction of a case main body and a lid of the energy storage device, an arrangement direction of the energy storage device, a bus bar holding member, and a bus bar, or a vertical direction is defined as a Z-axis direction. The X-axis direction, the Y-axis direction, and the Z-axis direction are directions intersecting (orthogonal to in the present embodiment) each other. Although a case where the Z-axis direction is not the vertical direction can be considered depending on a usage mode, the Z-axis direction will be described below as the vertical direction for convenience of description.

In description below, an X-axis plus direction indicates an arrow direction of the X axis in each drawing, and an X-axis minus direction indicates a direction opposite to the X-axis plus direction. The same applies to the Y-axis direction and the Z-axis direction. Furthermore, hereinafter, the Y-axis direction may be referred to as a first direction, the X-axis direction may be referred to as a second direction, and the Z-axis direction may be referred to as a third direction. Further, in a case where the Y-axis plus direction is a first side of the first direction, the Y-axis minus direction is a second side of the first direction, and in a case where the Y-axis minus direction is a first side of the first direction, the Y-axis plus direction is a second side of the first direction. The same applies to the second direction and the third direction. Furthermore, expressions indicating a relative direction or postures, such as parallel and orthogonal, include a case where the direction or posture is not strictly expressed. That two directions are orthogonal to each other not only means that the two directions are completely orthogonal to each other, but also means that the two directions are substantially orthogonal to each other, that is, a difference of, for example, about several percent is included. In description of the embodiment below, a case where an energy storage apparatus 10 shown in FIG. 1 is viewed in the Y-axis plus direction, is described.

Embodiment

[1 General Description of Energy Storage Apparatus 10]

Figure 2:
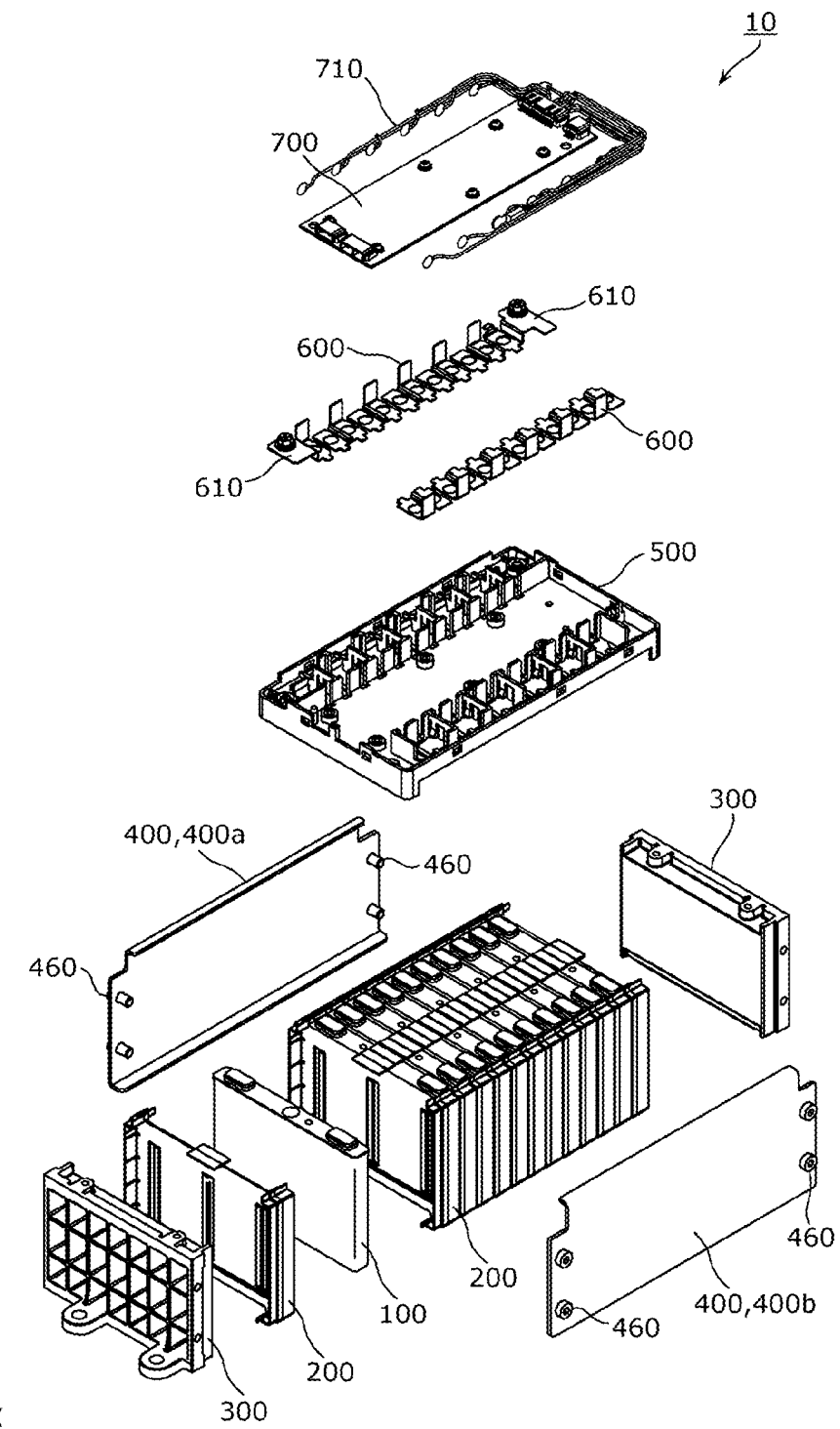
FIG. 2 is an exploded perspective view showing each constituent element in a case where the energy storage apparatus according to the embodiment is disassembled.

First, a configuration of the energy storage apparatus 10 will be described. FIG. 1 is a perspective view showing an external appearance of the energy storage apparatus 10 according to the present embodiment. FIG. 2 is an exploded perspective view showing each constituent element in a case where the energy storage apparatus 10 according to the present embodiment is disassembled.

The energy storage apparatus 10 is an apparatus capable of charging electricity from the outside and discharging electricity to the outside, and has a substantially rectangular parallelepiped shape in the present embodiment. The energy storage apparatus 10 is a battery module (assembled battery) used for energy storage application, power supply application, or the like. Specifically, the energy storage apparatus 10 is used as a battery or the like for driving or starting an engine of a moving body such as an automobile, a motorcycle, a watercraft, a snowmobile, an agricultural machine, a construction machine, or a railway vehicle for electric railway. Examples of the automobile include an electric vehicle (EV), a hybrid electric vehicle (HEV), a plug-in hybrid electric vehicle (PHEV), and a gasoline vehicle. Examples of the railway vehicle for an electric railway include a train, a monorail, and a linear motor car. The energy storage apparatus 10 can also be used as a stationary battery or the like used for home use, a generator, or the like.

As shown in FIG. 1 and FIG. 2, the energy storage apparatus 10 includes a plurality of energy storage devices 100, a plurality of spacers 200, a pair of end members 300, a pair of side members 400 (400a, 400b), a bus bar holding member 500, a plurality of bus bars 600, and a substrate 700.

The energy storage device 100 is a secondary battery (battery cell) capable of charging electricity and discharging electricity, and more specifically, is a nonaqueous electrolyte secondary battery such as a lithium ion secondary battery. The energy storage device 100 has a flat rectangular parallelepiped (prismatic) shape, and is arranged adjacent to the spacer 200. That is, each of a plurality of the energy storage devices 100 is alternately arranged with each of a plurality of the spacers 200 and arranged in the Y-axis direction (first direction). In the present embodiment, thirteen of the spacers 200 are arranged so that each of twelve of the energy storage devices 100 are sandwiched between the spacers 200.

The number of the energy storage devices 100 is not limited to twelve, and may be plural other than twelve or may be one. The shape of the energy storage device 100 is not particularly limited, and may be any shape such as a polygonal columnar shape other than a rectangular parallelepiped shape, a cylindrical shape, an elliptical columnar shape, or an elliptical columnar shape, or the energy storage device 100 may be a laminate-type energy storage device. The energy storage device 100 is not limited to a nonaqueous electrolyte secondary battery, and may be a secondary battery other than a nonaqueous electrolyte secondary battery, or may be a capacitor. The energy storage device 100 does not need to be a secondary battery and may be a primary battery that can use stored electricity without being charged by the user. Furthermore, the energy storage device 100 may be a battery using a solid electrolyte. The configuration of the energy storage device 100 will be described in detail later.

The spacer 200 is a rectangular plate-like spacer which is arranged in the Y-axis plus direction or the Y-axis minus direction (the first side or the second side in the first direction) of the energy storage device 100 and electrically insulates the energy storage device 100 from other members. Specifically, the spacer 200 is arranged between two of the energy storage devices 100 adjacent to each other and between the energy storage device 100 in an end portion and the end member 300, and provides insulation between the two energy storage devices 100 and between the energy storage device 100 in the end portion and the end member 300. In the present embodiment, thirteen of the spacers 200 are arranged corresponding to twelve of the energy storage devices 100. However, in a case where the number of the energy storage devices 100 is other than twelve, the number of the spacers 200 is also changed according to the number of the energy storage devices 100.

The spacer 200 is formed so as to cover, in addition to a long side surface (long side surface portion 121 described later) of the energy storage device 100, also substantially a half of a short side surface (short side surface portion 122 described later) on the Y-axis minus direction side or the Y-axis plus direction side of the energy storage device 100 with a spacer side wall portion 220 (see FIG. 5) described later. With such a configuration, two of the spacers 200 sandwiching the energy storage device 100 cover the short side surface of the energy storage device 100. For this reason, electrical insulation property between the energy storage device 100 and the side member 400 can be ensured. In particular, in the present embodiment, the spacer side wall portions 220 of two of the spacers 200 sandwiching the energy storage device 100 overlap each other, so that the entire short side surface of the energy storage device 100 is covered with the two spacers 200.

The spacer 200 is made from an insulating resin material or the like such as polycarbonate (PC), polypropylene (PP), polyethylene (PE), polyphenylene sulfide resin (PPS), polyphenylene ether (PPE (including modified PPE)), polyethylene terephthalate (PET), polyether ether ketone (PEEK), tetrafluoroethylene-perfluoroalkyl vinyl ether (PFA), polytetrafluoroethylene (PTFE), polybutylene terephthalate (PBT), polyether sulfone (PES), ABS resin, or a composite material of these. The spacer 200 may be made from a material other than resin as long as the spacer 200 has electrical insulation properties, and may be made from ceramic, a damma material formed by stacking and bonding mica pieces, or the like. It is not necessary that all of a plurality of the spacers 200 be made from the same material. More detailed description of the configuration of the spacer 200 will be described later.

The end members 300 and the side members 400 press the energy storage device 100 from the outer side in the arrangement direction of a plurality of the energy storage devices 100 (Y-axis direction, first direction). That is, the end members 300 and the side members 400 press each of the energy storage devices 100 included in a plurality of the energy storage devices 100 from both sides in the arrangement direction by sandwiching a plurality of the energy storage devices 100 from both sides in the arrangement direction.

Specifically, the end members 300 are flat block-shaped end plates (sandwiching members) which are arranged on both sides in the Y-axis direction of a plurality of the energy storage devices 100 and sandwich and hold a plurality of the energy storage devices 100 from both sides in the arrangement direction (Y-axis direction) of a plurality of the energy storage devices 100. The end member 300 is made from a metal (conductive) material such as aluminum, an aluminum alloy, stainless steel, iron, or a plated steel plate from a viewpoint of ensuring strength. The material of the end member 300 is not particularly limited, and for example, may be made from an insulating material having high strength, or may be subjected to insulation treatment. The end member 300 may be a plate-shaped end plate or the like instead of a block-shaped end plate.

The side members 400 are long and flat plate-like side plates (restraint member, restraint bar) which are arranged on both sides in the X-axis direction of a plurality of the energy storage devices 100 (both sides in the second direction intersecting the first direction), have both ends attached to the end members 300, and restrain a plurality of the energy storage devices 100 together. That is, the side member 400 is arranged to extend in the Y-axis direction over a plurality of the energy storage devices 100 and a plurality of the spacers 200, and applies a restraint force to a plurality of the energy storage devices 100 and a plurality of the spacers 200 in the arrangement direction (Y-axis direction) of a plurality of the energy storage devices 100 and a plurality of the spacers 200.

In the present embodiment, a pair of the side members 400 are arranged on both sides in the X-axis direction of a plurality of the energy storage devices 100 and a plurality of the spacers 200. Each of a pair of the side members 400 is attached to an end portion in the X-axis direction of a pair of the end members 300 in both end portions in the Y-axis direction. In this manner, a pair of the side members 400 sandwich and restrain a plurality of the energy storage devices 100 and a plurality of the spacers 200 from both sides in the X-axis direction and both sides in the Y-axis direction. Hereinafter, the side member 400 on the X-axis minus direction side is also referred to as a side member 400a, and the side member 400 on the X-axis plus direction side is also referred to as a side member 400b.

The side member 400 is joined to the end member 300 by a plurality of joining members 460 arranged in the Z-axis direction. In the present embodiment, the joining member 460 is a bolt that penetrates the side member 400 and is fastened to the end member 300. Similarly to the end member 300, the side member 400 is made from a metal (conductive) material or the like such as aluminum, an aluminum alloy, stainless steel, iron, or a plated steel plate from a viewpoint of ensuring strength. The side member 400 may be a block-shaped, rod-shaped member or the like instead of a plate-shaped side plate. The configuration of the side member 400 will be described in detail later.

The bus bar holding member 500 is a plate-like member (bus bar plate, bus bar frame) that can hold the bus bar 600, the substrate 700, and the like, electrically insulate the bus bar 600 and the like from other members, and regulate the position of the bus bar 600 and the like. The bus bar holding member 500 is made from an insulating resin material or the like similar to the spacer 200 such as PC, PP, and PE.

The bus bar 600 is a conductive plate-like member which is arranged on a plurality of the energy storage devices 100 and electrically connect electrode terminals (electrode terminals 140 to be described later) of a plurality of the energy storage devices 100 to each other. In the present embodiment, a plurality of the energy storage devices 100 are connected in series by sequentially connecting a positive electrode terminal and a negative electrode terminal among electrode terminals of the adjacent ones of the energy storage devices 100 using a plurality of the bus bars 600. An external terminal 610 (positive electrode external terminal, negative electrode external terminal) which is a terminal of the energy storage apparatus 10 is connected to the bus bar 600 arranged in an end portion. In the present embodiment, the bus bar 600 and the electrode terminal are connected by laser welding. Further, the bus bar 600 also includes a connection portion of a wiring for detecting a voltage or the like of the energy storage device 100, and the connection portion is bent in the Z-axis plus direction. The bus bar 600 is made from a conductive member or the like made from metal such as copper, a copper alloy, aluminum, or an aluminum alloy. A connection form between the energy storage devices 100 is not particularly limited, and any of the energy storage devices 100 may be connected in parallel. A connection method of the bus bar 600 and the electrode terminal may be welding other than laser welding, or screw fastening or the like according to the shape of the electrode terminal.

The substrate 700 is a circuit board mounted on the bus bar holding member 500, and an electronic component, a fuse, a relay, a shunt resistor, a connector, and the like for monitoring a charged state or a discharged state of the energy storage device 100 are arranged in the substrate 700. A wiring 710 is connected to the substrate 700 via a connector. In the present embodiment, the wirings 710 are bundled and connected to the substrate 700 in an end portion in the Y-axis plus direction of the energy storage apparatus 10. The wiring 710 includes a wiring for measuring a voltage of the energy storage device 100, a wiring for measuring a temperature, and the like, and one end of the wiring is connected to a connection portion of the bus bar 600.

[2 Description of Configuration of Energy Storage Device 100]

Figure 3:
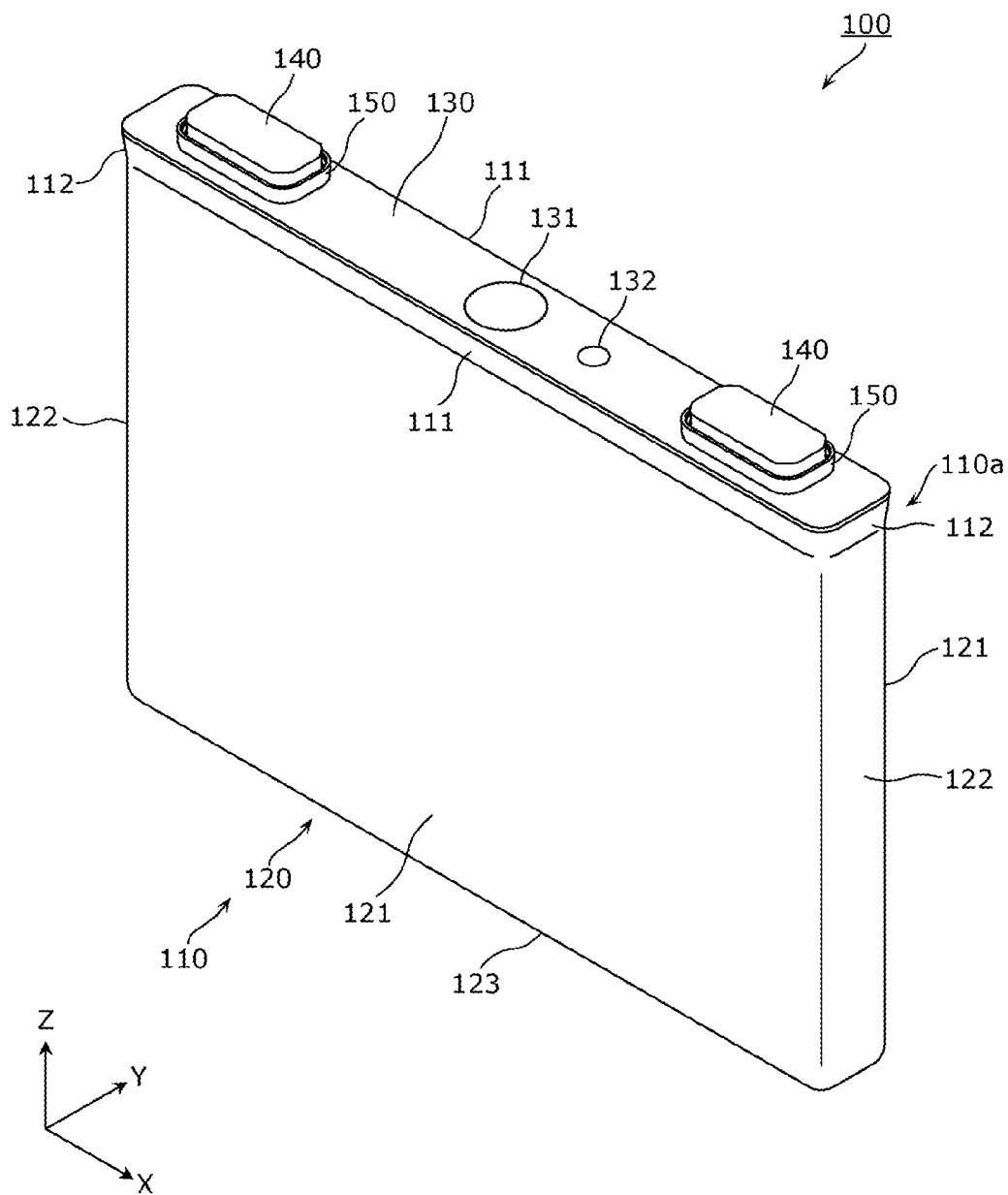
FIG. 3 is a perspective view showing a configuration of an energy storage device according to the embodiment.

Next, a configuration of the energy storage device 100 will be described in detail. FIG. 3 is a perspective view showing a configuration of the energy storage device 100 according to the present embodiment.

As shown in FIG. 3, the energy storage device 100 includes a case 110, a pair of the electrode terminals 140 (positive electrode terminal and negative electrode terminal), and a pair of gaskets 150. Although an electrode assembly, a current collector (positive electrode current collector and negative electrode current collector), electrolyte solution (nonaqueous electrolyte) and the like are accommodated in the case 110, these are not illustrated. A kind of the electrolyte solution is not particularly limited as long as the electrolyte solution does not impair performance of the energy storage device 100, and various kinds of electrolyte solution can be selected. A spacer may be arranged on a side or the like of the current collector, or an insulating sheet covering an outer surface of the case 110 may be arranged.

The case 110 is a rectangular parallelepiped (prismatic) case having a case main body 120 on which an opening is formed and a lid body 130 that closes the opening of the case main body 120. The case main body 120 is a member having a rectangular cylindrical shape and a bottom and constituting a main body portion of the case 110, and has a pair of the long side surface portions 121 on side surfaces on both sides in the Y-axis direction, a pair of the short side surface portions 122 on side surfaces on both sides in the X-axis direction, and a bottom surface portion 123 on the Z-axis minus direction side. The short side surface portion 122 is a rectangular flat surface which is adjacent to a pair of the long side surface portions 121 and the bottom surface portion 123 and has an area smaller than that of the long side surface portion 121. The bottom surface portion 123 is a rectangular flat surface adjacent to a pair of the long side surface portions 121 and a pair of the short side surface portions 122. The long side surface portion 121 is a rectangular flat surface which is adjacent to a pair of the short side surface portions 122 and the bottom surface portion 123 and has an area larger than that of the short side surface portion 122. The lid body 130 is a rectangular plate-like member constituting a lid portion (upper surface portion) of the case 110, and is arranged on the Z-axis plus direction side of the case main body 120. The lid body 130 is also provided with a gas release valve 131 that releases pressure inside the case 110 in a case where the pressure increases, an electrolyte solution filling unit 132 for filling the case 110 with electrolyte solution, and the like.

With such a configuration, the case 110 has a structure in which the inside is sealed as the case main body 120 and the lid body 130 are joined by welding or the like after an electrode assembly and the like are accommodated in the inside of the case main body 120. The material of the case 110 (the case main body 120 and the lid body 130) is not particularly limited, but is preferably weldable (joinable) metal such as stainless steel, aluminum, an aluminum alloy, iron, or a plated steel plate.

Further, the case 110 has a case protruding portion 110a protruding outward. The case protruding portion 110a is a protruding portion formed over the entire circumference of the lid body 130 and an end portion on the lid body 130 side (Z-axis plus direction side) of the case main body 120. Since the lid body 130 is an upper surface portion of the case 110, the case protruding portion 110a includes a part of the upper surface portion of the case 110. That is, the case protruding portion 110a has a pair of long side surface protruding portions 111 in an end portion on the Z-axis plus direction side of a pair of the long side surface portions 121, and has a pair of short side surface protruding portions 112 in an end portion on the Z-axis plus direction side of a pair of the short side surface portions 122. A pair of the long side surface protruding portions 111 extend in the X-axis direction and have a shape gradually expanding in the Y-axis direction toward the Z-axis plus direction (inclined with respect to the Z-axis direction). A pair of the short side surface portions 122 extend in the Y-axis direction and have a shape gradually expanding in the X-axis direction toward the Z-axis plus direction (inclined with respect to the Z-axis direction). As described above, the case protruding portion 110a is a tapered portion including a pair of the long side surface protruding portions 111, a pair of the short side surface protruding portions 112, and a peripheral portion of the lid body 130 and gradually protruding outward toward the Z-axis plus direction.

Such a case protruding portion 110a is formed on the case 110 for a reason described below. In order to thicken a welded portion between the case main body 120 and the lid body 130 to facilitate welding between the case main body 120 and the lid body 130 or to increase welding strength, there is a case where the case protruding portion 110a is formed in an end portion on the lid body 130 side of the case main body 120. There is a case where the case protruding portion 110a is formed in an end portion on the lid body 130 side of the case main body 120 so that the opening of the case main body 120 is expanded and content such as an electrode assembly can be easily put into the case main body 120. In order to position the case 110 with respect to another member, there is a case where the case protruding portion 110a for engaging, fitting, or the like with another member is formed. In this case, since a central portion of the case main body 120 of the case 110 is likely to swell, the case protruding portion 110a is preferably formed in an end portion (in the present embodiment, an end portion on the lid body 130 side) of the case main body 120 that is not likely to swell.

The electrode terminal 140 is a terminal (positive electrode terminal and negative electrode terminal) of the energy storage device 100 arranged on the lid body 130 of the case 110, and is electrically connected to a positive electrode plate and a negative electrode plate of the electrode assembly through a current collector. That is, the electrode terminal 140 is a metal member for leading out electricity stored in the electrode assembly to an external space of the energy storage device 100 and for introducing electricity into an internal space of the energy storage device 100 for storing electricity in the electrode assembly. The electrode terminal 140 is arranged so as to protrude from the lid body 130 of the case 110 in the Z-axis plus direction (first side of the third direction intersecting the first direction and the second direction). The electrode terminal 140, which has a flat plate shape to be welded to the bus bar 600, may include a bolt terminal so as to be screw-fastened. The electrode terminal 140 is made from aluminum, an aluminum alloy, copper, a copper alloy, or the like.

The gasket 150 is arranged between the electrode terminal 140 and the lid body 130 and between the lid body 130 and the current collector, and is a member for ensuring electrical insulation and airtightness between the electrode terminal 140 and the lid body 130 and between the lid body 130 and the current collector. The gasket 150 is made from an insulating material or the like such as PP, PE, PPS, PET, PEEK, PFA, PTFE, PBT, PES, and ABS resin.

The electrode assembly is an energy storage element (power generating element) formed by stacking a positive electrode plate, a negative electrode plate, and a separator. The positive electrode plate included in the electrode assembly includes a positive active material layer formed on a positive electrode substrate layer which is an elongated strip-shaped current collecting foil made from metal such as aluminum or an aluminum alloy. The negative electrode plate includes a negative active material layer formed on a negative electrode substrate layer which is an elongated strip-shaped current collecting foil made from metal such as copper or a copper alloy. As a positive active material used for the positive active material layer and a negative active material used for the negative active material layer, a known material can be appropriately used as long as the material can occlude and discharge lithium ions. The current collector is a member (positive electrode current collector and negative electrode current collector) that has conductivity and rigidity and is electrically connected to the electrode terminal 140 and the electrode assembly. The positive electrode current collector is made from aluminum, an aluminum alloy or the like similarly to the positive electrode substrate layer of the positive electrode plate, and the negative electrode current collector is made from copper, a copper alloy or the like similarly to the negative electrode substrate layer of the negative electrode plate.

In the present embodiment, when viewed on the X-axis plus direction side of the energy storage apparatus 10, the X-axis plus direction is interpreted as a first side of the second direction, and when viewed on the X-axis minus direction side of the energy storage apparatus 10, the X-axis minus direction is interpreted as a first side of the second direction.

[3 Description of Configuration of Side Member 400]

Figure 4:
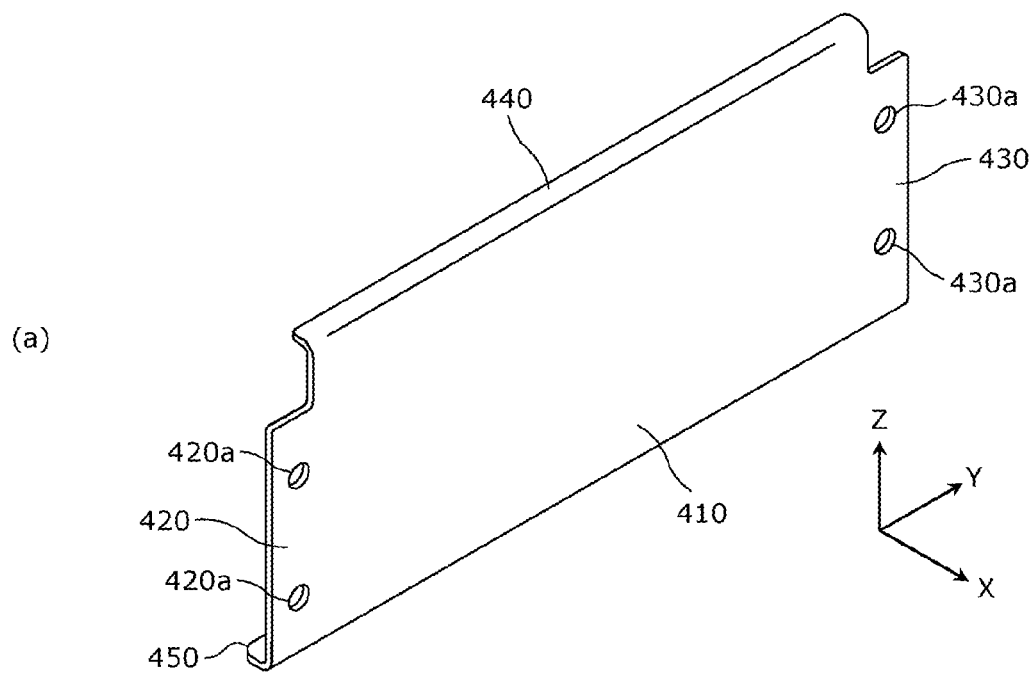
FIG. 4 is a perspective view showing a configuration of a side member according to the embodiment.
Figure 4:
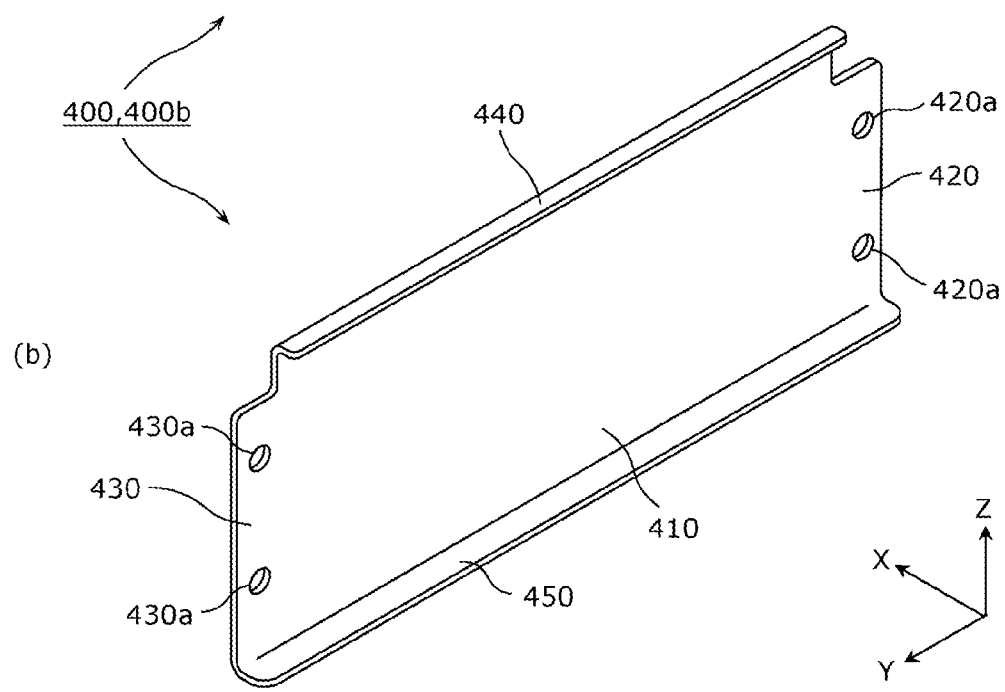

Next, a configuration of the side member 400 will be described in detail. FIG. 4 is a perspective view showing the configuration of the side member 400 according to the present embodiment. Specifically, FIG. 4(a) is a perspective view illustrating a configuration of the side member 400b on the X-axis plus direction side in FIG. 2. FIG. 4(b) is a perspective view illustrating a configuration in a case where the side member 400b in FIG. 4(a) is viewed from the opposite side in the X-axis direction. The side member 400b on the X-axis plus direction side and the side member 400a on the X-axis minus direction side have the identical shape, and have the same configuration when rotated by 180° around the Z axis.

As shown in FIG. 4, the side member 400 includes a side main body portion 410, side connection portions 420 and 430, a first side protruding portion 440, and a second side protruding portion 450. Hereinafter, the side member 400b on the X-axis plus direction side will be described, and the side member 400a on the X-axis minus direction side will not be described in detail since the side member 400a is one in which the direction in the X-axis direction in description below is reversed.

In description of FIG. 4 below, the X-axis plus direction will be described as a first side of the second direction.

Figure 6:
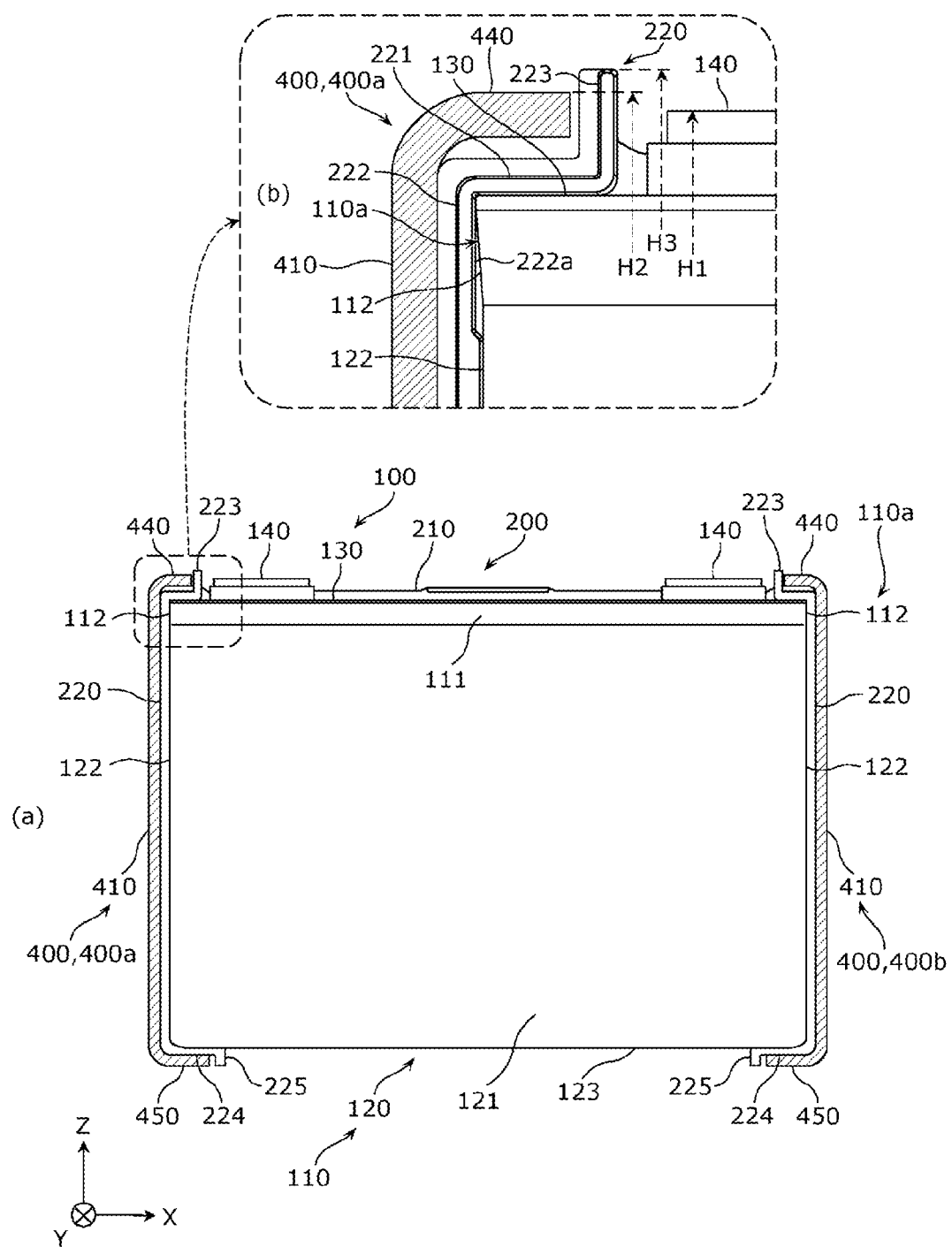
FIG. 6 is a front view showing a positional relationship between the energy storage device, the spacer, and the side member according to the embodiment.

The side main body portion 410 illustrated in FIG. 4 is a rectangular and flat plate-like portion constituting a main body of the side member 400b, and is arranged to extend in parallel to a YZ plane and in the Y-axis direction. As also shown in FIG. 6 described later, the side main body portion 410 of the side member 400b is arranged in the X-axis plus direction (first side in the second direction) of the energy storage device 100. Specifically, the side main body portion 410 is arranged in the X-axis plus direction of the energy storage device 100 and the spacer 200. That is, the side main body portion 410 of the side member 400b is arranged on the X-axis plus direction side of the energy storage device 100 and the spacer 200.

The side connection portion 420 is an end portion on the Y-axis minus direction side of the side member 400b, and is arranged to extend from an end edge on the Y-axis minus direction side of the side main body portion 410 toward the Y-axis minus direction side. That is, the side connection portion 420 is a rectangular-shaped flat-plate-like portion which is provided continuously from the side main body portion 410 to extend toward the Y-axis minus direction side, is parallel to the YZ plane, and extends in the Z-axis direction. On the side connection portion 420, two circular through holes 420a arranged in the Z-axis direction are formed so as to penetrate the side connection portion 420 in the X-axis direction. The joining member 460 is inserted into the through hole 420a and fastened to an end portion of the end member 300, so that the side connection portion 420 is connected (fixed) to the end member 300.

The side connection portion 430 is an end portion on the Y-axis plus direction side of the side member 400b, and is arranged to extend from an end edge on the Y-axis plus direction side of the side main body portion 410 toward the Y-axis plus direction side. That is, the side connection portion 430 is a rectangular-shaped flat-plate-like portion which is provided continuously from the side main body portion 410 to extend toward the Y-axis plus direction side, is parallel to the YZ plane, and extends in the Z-axis direction. On the side connection portion 430, two circular through holes 430a arranged in the Z-axis direction are formed so as to penetrate the side connection portion 430 in the X-axis direction. The joining member 460 is inserted into the through hole 430a and fastened to an end portion of the end member 300, so that the side connection portion 430 is connected (fixed) to the end member 300.

The first side protruding portion 440 is an end portion on the Z-axis plus direction side of the side member 400b, and is arranged so as to protrude in the X-axis direction from an end portion on the Z-axis plus direction side of the side main body portion 410. Specifically, the first side protruding portion 440 is a rectangular-shaped flat-plate-like portion which is arranged parallel to an XY plane and extends in the Y-axis direction. As shown also in the side member 400b on the X-axis plus direction side in FIG. 6(a) described later, the first side protruding portion 440 is arranged so as to protrude in the X-axis minus direction (second side in the second direction) from the side main body portion 410 toward the electrode terminal 140 of the energy storage device 100.

The second side protruding portion 450 is an end portion on the Z-axis minus direction side of the side member 400b, and is arranged so as to protrude in the X-axis direction from an end portion on the Z-axis minus direction side of the side main body portion 410. Specifically, the second side protruding portion 450 is a rectangular-shaped flat-plate-like portion which is arranged parallel to the XY plane and extends in the Y-axis direction. As shown also in the side member 400b on the X-axis plus direction side in FIG. 6(a) described later, the second side protruding portion 450 is arranged so that the case 110 of the energy storage device 100 is sandwiched between the second side protruding portion 450 and the first side protruding portion 440, and is arranged so as to protrude in the X-axis minus direction (second side in the second direction) from the side main body portion 410.

[4 Description of Configuration of Spacer 200]

Figure 5:
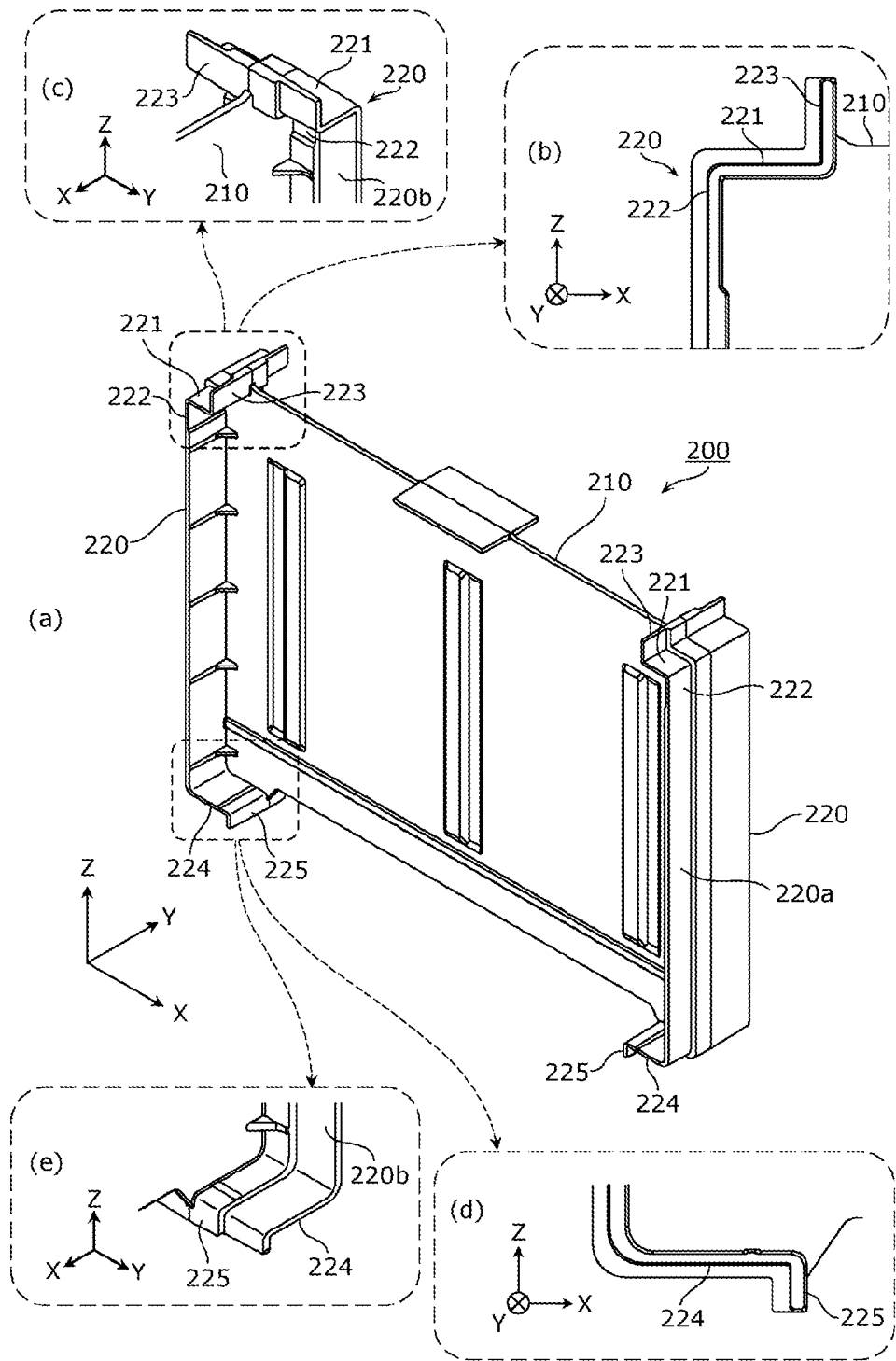
FIG. 5 is a perspective view and a front view showing a configuration of a spacer according to the embodiment.

Next, a configuration of the spacer 200 will be described in detail. FIG. 5 is a perspective view and a front view showing the configuration of the spacer 200 according to the present embodiment. Specifically, FIG. 5(a) is a perspective view showing the configuration of the spacer 200 shown in FIG. 2. FIG. 5(b) is a front view illustrating, in an enlarged manner, a configuration of an end portion on the X-axis minus direction side and the Z-axis plus direction side of the spacer 200 when viewed from the Y-axis minus direction side, and FIG. 5(c) is a perspective view of a portion of FIG. 5(b) when viewed from the opposite side to FIG. 5(a) (Y-axis plus direction side). FIG. 5(d) is a front view illustrating, in an enlarged manner, a configuration of an end portion on the X-axis minus direction side and the Z-axis minus direction side of the spacer 200 when viewed from the Y-axis minus direction side, and FIG. 5(e) is a perspective view of a portion of FIG. 5(d) when viewed from the opposite side to FIG. 5(a) (Y-axis plus direction side).

FIG. 6 is a front view showing a positional relationship between the energy storage device 100, the spacer 200, and the side member 400 according to the present embodiment. Specifically, FIG. 6(a) is a front view showing a configuration in a case where the energy storage device 100, the spacer 200, and the side member 400 are assembled to each other as viewed from the Y-axis minus direction side. FIG. 6(b) is a front view illustrating, in an enlarged manner, a configuration of an end portion on the X-axis minus direction side and the Z-axis plus direction side of the configuration of FIG. 6(a) when viewed from the Y-axis minus direction side. Note that, in the diagrams of FIGS. 6(a) and 6(b), the side member 400 is in a cross-sectional view.

As illustrated in FIGS. 5 and 6, the spacer 200 includes a spacer main body portion 210 and a spacer side wall portion 220. The spacer main body portion 210 is a rectangular-shaped and flat-plate-like portion constituting a main body of the spacer 200, and is arranged in parallel to the XZ plane. As described above, the spacer main body portions 210 are arranged on both sides in the Y-axis direction (both sides in the first direction) of the energy storage device 100. FIG. 6 shows a state where the spacer main body portion 210 is arranged on the Y-axis plus direction side of the energy storage device 100 (the spacer main body portion 210 is hidden behind the energy storage device 100 and cannot be seen).

The spacer side wall portion 220 is a wall portion which is arranged so as to extend in the Z-axis direction in an end portion of the spacer 200 in the X-axis direction and is arranged so as to cover an end portion in the X-axis direction of the energy storage device 100. In the present exemplary embodiment, portions on both the Y-axis minus direction side and the Y-axis plus direction side of spacer main body portion 210 are defined as the spacer side wall portion 220. Two of the spacer side wall portions 220 are arranged in both end portions in the X-axis direction of the spacer 200 and cover both end portions in the X-axis direction of the energy storage device 100. Specifically, the two spacer side wall portions 220 are arranged so as to cover substantially a half portion in the Y-axis direction of a pair of the short side surface portions 122 of the case 110 of the energy storage device 100, both end portions in the X-axis direction of the lid body 130, and both end portions in the X-axis direction of the bottom surface portion 123.

In particular, in the present embodiment, the spacer side wall portions 220 of two of the spacers 200 sandwiching the case 110 of the energy storage device 100 overlap each other, so that the entire surface of the short side surface portion 122 of the energy storage device 100 is covered with the two spacer side wall portions 220 without any gap. Specifically, as illustrated in FIG. 5(a), a stepped portion 220a having a recessed outer surface and extending in the Z-axis direction is formed in a portion on the Y-axis minus direction side of the spacer side wall portion 220. As illustrated in FIGS. 5(c) and 5(e), a stepped portion 220b having a recessed inner surface and extending in the Z-axis direction is formed in a portion on the Y-axis plus direction side of the spacer side wall portion 220. In this manner, the stepped portions 220a and 220b of the spacer side wall portions 220 adjacent to each other of two of the spacers 200 which sandwich the case 110 of the energy storage device 100 overlap with each other, and the entire surface of the short side surface portion 122 of the case 110 is covered without any gap.

The spacer side wall portion 220 of each of a plurality of the spacers 200 includes a first abutting portion 221, a second abutting portion 222, a first spacer protruding portion 223, a third abutting portion 224, and a second spacer protruding portion 225. Each of the first abutting portion 221, the second abutting portion 222, the first spacer protruding portion 223, the third abutting portion 224, and the second spacer protruding portion 225 includes a part of a portion on the Y-axis minus direction side of the spacer side wall portion 220 and a part of a portion on the Y-axis plus direction side of the spacer side wall portion 220.

The spacer side wall portion 220 on the X-axis plus direction side and the spacer side wall portion 220 on the X-axis minus direction side have the same configuration. For this reason, hereinafter, for convenience of description, the configuration of the spacer side wall portion 220 on the X-axis minus direction side will be described in detail, and description of the configuration of the spacer side wall portion 220 on the X-axis plus direction side will be omitted. Further, the side member 400 related to the description of the spacer side wall portion 220 below is the side member 400a on the X-axis minus direction side.

In description of FIG. 6 below, the X-axis minus direction will be described as a first side of the second direction.

The first abutting portion 221 is a rectangular-shaped flat-plate-like portion which is arranged in an end portion on the Z-axis plus direction side of the spacer side wall portion 220 and is parallel to the XY plane. The first abutting portion 221 is arranged in a manner that an end portion on the X-axis minus direction side is connected to an end portion on the Z-axis plus direction side of the second abutting portion 222, and an end portion on the X-axis plus direction side is connected to an end portion on the Z-axis minus direction side of the first spacer protruding portion 223.

The first abutting portion 221 is arranged between the first side protruding portion 440 of the side member 400a and the case protruding portion 110a of the case 110 in the Z-axis direction. That is, the case protruding portion 110a is arranged in the Z-axis minus direction (second side in the third direction) of the first side protruding portion 440 and the first abutting portion 221, and the first abutting portion 221 is arranged in the Z-axis minus direction of the first side protruding portion 440. In this manner, the case protruding portion 110a abuts on the first abutting portion 221 in the Z-axis plus direction (first side in the third direction). That is, an inner surface of the first abutting portion 221 abuts on the case protruding portion 110a in the Z-axis direction (third direction). In the present exemplary embodiment, a surface facing the case protruding portion 110a (inner surface, a surface on the Z-axis minus direction side) of the first abutting portion 221 is an inclined surface that is slightly inclined in the Z-axis plus direction (direction away from case protruding portion 110a) toward the Y-axis minus direction, and this inclined surface abuts on the case protruding portion 110a. The first abutting portion 221 is arranged in a state of being separated from the first side protruding portion 440.

The second abutting portion 222 is a rectangular-shaped flat-plate-like portion which is arranged in an end portion on the Z-axis plus direction side of the spacer side wall portion 220 and is parallel to the YZ plane. The second abutting portion 222 is arranged in a manner that an end portion on the Z-axis plus direction side is connected to an end portion on the X-axis minus direction side of the first abutting portion 221.

The second abutting portion 222 is arranged between the side main body portion 410 of the side member 400a and the case protruding portion 110a in the X-axis direction. That is, the case protruding portion 110a protrudes in the X-axis minus direction (first side in the second direction), and is arranged in the X-axis plus direction of the second abutting portion 222 and the side main body portion 410, and the second abutting portion 222 is arranged in the X-axis plus direction of the side main body portion 410. In this manner, the case protruding portion 110a abuts on the second abutting portion 222 in the X-axis minus direction (first side in the second direction). That is, an inner surface of the second abutting portion 222 abuts on the case protruding portion 110a in the X-axis direction (second direction).

In the present embodiment, the case protruding portion 110a has an inclined surface inclined with respect to the second abutting portion 222 on a surface facing the second abutting portion 222 (surface on the X-axis minus direction side of the short side surface protruding portion 112), and this inclined surface abuts on the second abutting portion 222. Specifically, a surface on the X-axis minus direction side of the case protruding portion 110a is inclined in the X-axis plus direction (direction away from the second abutting portion 222) toward the Z-axis minus direction. In the second abutting portion 222, a surface facing the case protruding portion 110a (surface on the X-axis plus direction side) is an inclined surface slightly inclined in the X-axis minus direction (direction away from the case protruding portion 110a) toward the Y-axis minus direction. In the present embodiment, as shown in FIG. 6, on the X-axis plus direction side of the second abutting portion 222, a recessed portion 222a recessed in the X-axis minus direction with the inclined surface as a bottom surface is formed, and the case protruding portion 110a is accommodated in the recessed portion 222a. As described above, the second abutting portion 222 and the case protruding portion 110a have inclined surfaces inclined in different directions, and the inclined surfaces abut on each other.

The third abutting portion 224 is a rectangular-shaped flat-plate-like portion which is arranged in an end portion on the Z-axis minus direction side of the spacer side wall portion 220 and is parallel to the XY plane. The third abutting portion 224 is arranged in a manner that an end portion on the X-axis plus direction side is connected to an end portion on the Z-axis plus direction side of the second spacer protruding portion 225.

The third abutting portion 224 is arranged between the second side protruding portion 450 of the side member 400a and the bottom surface portion 123 of the case 110. In this manner, the bottom surface portion 123 abuts on the third abutting portion 224 in the Z-axis minus direction. In the present embodiment, a surface facing the bottom surface portion 123 (surface on the Z-axis plus direction side) of the third abutting portion 224 is an inclined surface slightly inclined in the Z-axis minus direction (direction away from the bottom surface portion 123) toward the Y-axis minus direction, and this inclined surface abuts on the bottom surface portion 123.

The third abutting portion 224 is arranged so that the case 110 is sandwiched between the third abutting portion 224 and the first abutting portion 221. As described above, the spacer 200 sandwiches the case 110 in the Z-axis direction between the first abutting portion 221 and the third abutting portion 224. The side member 400a sandwiches the first abutting portion 221 and the third abutting portion 224 of the spacer 200 in the Z-axis direction between the first side protruding portion 440 and the second side protruding portion 450. With such a configuration, the movement in the Z-axis direction of the energy storage device 100 is restricted.

The case protruding portion 110a does not always need to abut on the first abutting portion 221, and the case protruding portion 110a may have a configuration in which a gap is usually formed between the case protruding portion 110a and the first abutting portion 221, and the case protruding portion 110a abuts on the first abutting portion 221 in a case where vibration or impact is applied from the outside and the like. Similarly, the case protruding portion 110a does not always need to abut on the second abutting portion 222, and similarly, the bottom surface portion 123 does not always need to abut on the third abutting portion 224.

The first spacer protruding portion 223 is a rectangular-shaped flat-plate-like portion which protrudes in the Z-axis plus direction from an end portion on the X-axis plus direction side of the first abutting portion 221 and is parallel to the YZ plane. Since the first spacer protruding portion 223 is also connected to the spacer main body portion 210, it can be said that the first spacer protruding portion 223 protrudes from the spacer main body portion 210 in the Z-axis plus direction.

The first spacer protruding portion 223 is arranged between the electrode terminal 140 of the energy storage device 100 and the first side protruding portion 440 of the side member 400a in the X-axis direction. That is, the first spacer protruding portion 223 is arranged so as to separate the electrode terminal 140 and the first side protruding portion 440 in a state of being separated from the electrode terminal 140 and the first side protruding portion 440. Specifically, the first spacer protruding portion 223 is arranged so as to protrude in the Z-axis plus direction from the spacer main body portion 210 further than both the electrode terminal 140 and the first side protruding portion 440. That is, the first spacer protruding portion 223 protrudes from the spacer main body portion 210 (and an end portion on the X-axis plus direction side of the first abutting portion 221) toward the Z-axis plus direction, and is arranged to extend to a position more on the Z-axis plus direction side than both the electrode terminal 140 and the first side protruding portion 440.

The first spacer protruding portion 223 only needs to be arranged so as to protrude in the Z-axis plus direction (first side in the third direction) from the spacer main body portion 210 further than at least one of the electrode terminal 140 and the first side protruding portion 440. That is, the first spacer protruding portion 223 only needs to be arranged so as to protrude in the Z-axis plus direction further than members arranged in the Z-axis minus direction of the electrode terminal 140 and the first side protruding portion 440. In the present embodiment, an outer surface of the electrode terminal 140 in the Z-axis direction is arranged further in the Z-axis minus direction than the first side protruding portion 440. For this reason, a highest point of the first spacer protruding portion 223 in the Z-axis direction only needs to be arranged so as to protrude in the Z-axis plus direction further than at least the outer surface of the electrode terminal 140. Specifically, as shown in FIG. 6(b), since a height H1 of the outer surface of the electrode terminal 140 is lower than a height H2 of a surface in the Z-axis plus direction of the first side protruding portion 440, a height H3 of a surface in the Z-axis plus direction of the first spacer protruding portion 223 is larger than the height H1 of the outer surface of the electrode terminal 140.

If the outer surface of the electrode terminal 140 is arranged in the Z-axis plus direction further than the first side protruding portion 440, the highest point of the first spacer protruding portion 223 in the Z-axis direction only needs to be arranged so as to protrude in the Z-axis plus direction further than at least the first side protruding portion 440, and may be arranged in the Z-axis minus direction further than the outer surface of the electrode terminal 140. Specifically, if the height H1 of the electrode terminal 140 is larger than the height H2 of the first side protruding portion 440, the height H3 of the first spacer protruding portion 223 only needs to be larger than at least the height H2 of the first side protruding portion 440, and may be lower than the height H1 of the electrode terminal 140.

However, the first spacer protruding portion 223 is preferably arranged so as to protrude in the Z-axis plus direction further than both the electrode terminal 140 and the first side protruding portion 440, that is, the first side protruding portion 440. Specifically, the height H3 of the first spacer protruding portion 223 is preferably larger than the height H1 of the electrode terminal 140 and the height H2 of the first side protruding portion 440.

The second spacer protruding portion 225 is a rectangular-shaped flat-plate-like portion which protrudes in the Z-axis minus direction from an end portion on the X-axis plus direction side of the third abutting portion 224 and is parallel to the YZ plane. Since the second spacer protruding portion 225 is also connected to the spacer main body portion 210, it can be said that the second spacer protruding portion 225 protrudes from the spacer main body portion 210 in the Z-axis minus direction (second side in the third direction).

The second spacer protruding portion 225 is arranged in the X-axis plus direction (second side in the second direction) of the second side protruding portion 450 of the side member 400a. That is, the second spacer protruding portion 225 is arranged to protrude in the Z-axis minus direction so as to separate the second side protruding portion 450 and the bottom surface portion 123 of the case 110 in a state of being separated from the second side protruding portion 450. A protruding amount of the second spacer protruding portion 225 is not particularly limited. However, the second spacer protruding portion 225 is preferably arranged to extend to the same position in the Z-axis direction as a surface on the Z-axis minus direction side of the second side protruding portion 450, or to a position on the Z-axis minus direction side further than the surface.

[5 Description of Effect]

As described above, according to the energy storage apparatus 10 of the present embodiment, the side member 400 has the first side protruding portion 440 which protrudes toward the electrode terminal 140 of the energy storage device 100, and the spacer 200 has the first spacer protruding portion 223 which protrudes further than at least one of the electrode terminal 140 and the first side protruding portion 440 between the electrode terminal 140 and the first side protruding portion 440. Since the first side protruding portion 440 is arranged so as to protrude toward the electrode terminal 140 as described above, there is a possibility that the electrode terminal 140 and the first side protruding portion 440 are short-circuited. For this reason, in the spacer 200, the first spacer protruding portion 223 protruding further than at least one of the electrode terminal 140 and the first side protruding portion 440 is arranged between the electrode terminal 140 and the first side protruding portion 440. In this manner, it is possible to improve electrical insulation property between the electrode terminal 140 and the first side protruding portion 440. Accordingly, it is possible to reduce a possibility of occurrence of a short circuit between the energy storage device 100 and the side member 400. With the arrangement of the first spacer protruding portion 223, it is possible to increase an insulation distance (space distance and creepage distance) between the side member 400 and the electrode terminal 140 to improve electrical insulation property and to reduce a possibility of occurrence of a short circuit between the energy storage device 100 and the side member 400.

In the energy storage apparatus 10, the side member 400 has the second side protruding portion 450 protruding toward the second side in the second direction (the X-axis plus direction or the X-axis minus direction) so that the case 110 of the energy storage device 100 is sandwiched between the second side protruding portion 450 and the first side protruding portion 440. The spacer 200 has the second spacer protruding portion 225 on the second side in the second direction of the second side protruding portion 450. As described above, since the second side protruding portion 450 of the side member 400 is arranged so that the case 110 of the energy storage device 100 is sandwiched between the second side protruding portion 450 and the first side protruding portion 440, there is a possibility that the case 110 of the energy storage device 100 and the second side protruding portions 450 are short-circuited. For this reason, in the spacer 200, the second spacer protruding portion 225 is arranged on the second side in the second direction of the second side protruding portion 450. In this manner, since an insulation distance (space distance and creepage distance) between the case 110 and the second side protruding portion 450 can be increased and electrical insulation property can be improved, a possibility of occurrence of a short circuit between the energy storage device 100 and the side member 400 can be reduced.

In the present embodiment, the case 110 of the energy storage device 100 has neither positive electrode potential nor negative electrode potential. However, it is important to improve insulation property between the case 110 made from metal and another metal member, and it is effective to increase an insulation distance. In the energy storage device 100, in a case where the case 110 has positive electrode potential or negative electrode potential, a configuration for improving insulation property between the case 110 and another metal member is particularly useful.

The case 110 of the energy storage device 100 has the case protruding portion 110a which protrudes to the first side in the second direction on the second side in the third direction (Z-axis minus direction) of the first side protruding portion 440, so that the width of the energy storage device 100 in the second direction is increased. For the above reason, an area of a surface on the first side in the third direction (surface facing the spacer 200) of the energy storage device 100 is increased, a contact area between the energy storage device 100 and the first abutting portion 221 of the spacer 200 is increased, and movement toward the first side in the third direction (Z-axis plus direction) of the energy storage device 100 can be suppressed. In this manner, it is possible to reduce a possibility of occurrence of a short circuit between the energy storage device 100 and the side member 400. The spacer 200 is arranged on the first side in the first direction (the Y-axis plus direction or the Y-axis minus direction) of the energy storage device 100 to suppress the movement in the first direction of the energy storage device 100, and the side member 400 is arranged on the first side in the second direction of the energy storage device 100 to suppress the movement in the second direction of the energy storage device 100. With such a configuration, it is possible to suppress the movement of the energy storage device 100 in three directions of the first direction, the second direction and the third direction.

The spacer 200 has, between the first side protruding portion 440 of the side member 400 and the case protruding portion 110a of the case 110 of the energy storage device 100, the first abutting portion 221 on which the case protruding portion 110a abuts in the third direction. As described above, the case protruding portion 110a abuts on the first abutting portion 221 so that the movement of the energy storage device 100 in the third direction can be further suppressed. Accordingly, a possibility of occurrence of a short circuit between the energy storage device 100 and the side member 400 can be further reduced. Since the first abutting portion 221 is arranged between the first side protruding portion 440 and the case protruding portion 110a, it is possible to improve electrical insulation property between the first side protruding portion 440 and the case protruding portion 110a. Accordingly, it is possible to reduce a possibility of occurrence of a short circuit between the energy storage device 100 and the side member 400.

The spacer 200 has, between the side main body portion 410 of the side member 400 and the case protruding portion 110a of the case 110 of the energy storage device 100, the second abutting portion 222 on which the case protruding portion 110a abuts in the second direction. As described above, since the second abutting portion 222 is arranged between the side main body portion 410 and the case protruding portion 110a, it is possible to improve electrical insulation property between the side main body portion 410 and the case protruding portion 110a. Accordingly, it is possible to reduce a possibility of occurrence of a short circuit between the energy storage device 100 and the side member 400. With the case protruding portion 110a abutting on the second abutting portion 222, it is possible to further suppress the movement of the energy storage device 100 in the second direction.

The case protruding portion 110a of the case 110 has an inclined surface inclined with respect to the second abutting portion 222 on a surface facing the second abutting portion 222 of the spacer 200. In a case where the surface in the second direction of the case protruding portion 110a is parallel to the second abutting portion 222, it is necessary to cause the case protruding portion 110a to protrude accurately so that the first abutting portion 221 and the case protruding portion 110a abut on each other. For this reason, a surface facing the second abutting portion 222 of the case protruding portion 110a is inclined with respect to the second abutting portion 222. In this manner, the first abutting portion 221 can be easily caused to abut on the case protruding portion 110a, and the movement of the energy storage device 100 in the second direction can be easily restricted. Accordingly, it is possible to further reduce a possibility of occurrence of a short circuit between the energy storage device 100 and the side member 400. The same applies also to an inclined surface of the first abutting portion 221, the second abutting portion 222, and the third abutting portion 224.

[6 Description of Modification Example]

Although the energy storage apparatus 10 according to the embodiment of the present invention is described above, the present invention is not limited to this embodiment. That is, the embodiment disclosed herein is illustrative in all respects and is not restrictive, and the scope of the present invention is defined by the claims, and includes all changes within the meaning and scope equivalent to the claims.

In the above-mentioned embodiment, the side member 400 is a member which restrains the energy storage device 100. However, the side member 400 only needs to be a member arranged on the second direction side of the energy storage device 100, and does not need to restrain the energy storage device 100.

In the above embodiment, the side member 400 is made from a conductive material. However, in the side member 400, the first side protruding portion 440 and the second side protruding portion 450 may be made from a conductive material, and portions other than the first side protruding portion 440 and the second side protruding portion 450 may be made from an insulating material or may be subjected to insulation treatment. The second side protruding portion 450 may also be made from an insulating material or subjected to insulation treatment.

In the above embodiment, the spacer 200 is made from an insulating material. However, in the spacer 200, portions other than the first abutting portion 221, the second abutting portion 222, the first spacer protruding portion 223, the third abutting portion 224, and the second spacer protruding portion 225 may be made from a conductive material as long as electrical insulation property can be ensured by other means. The first abutting portion 221, the second abutting portion 222, and the third abutting portion 224 may also be made from a conductive material as long as electrical insulation property can be ensured by other means. Furthermore, the second spacer protruding portion 225 may also be made from a conductive material. That is, at least the first spacer protruding portion 223 may be made from an insulating material.

In the above embodiment, the side member 400 has the second side protruding portion 450, and the spacer 200 has the second spacer protruding portion 225. However, the side member 400 does not need to have the second side protruding portion 450, and the spacer 200 does not need to have the second spacer protruding portion 225. In a case where the side member 400 does not have the second side protruding portion 450, the spacer 200 does not need to have the third abutting portion 224. The spacer 200 does not need to have the first abutting portion 221 or the second abutting portion 222, and another insulating member may be arranged at the position of the first abutting portion 221 or the second abutting portion 222.

In the above-mentioned embodiment, the case 110 of the energy storage device 100 has the case protruding portion 110a. However, the case 110 does not need to have the case protruding portion 110a. In this case, the first abutting portion 221 and the second abutting portion 222 of the spacer 200 abut on an upper surface (upper surface portion) and a side surface (short side surface portion) of the case 110.

In the above embodiment, all the spacers 200 have the above configuration. However, any of the spacers 200 may be configured not to have the above configuration. The same applies also to the energy storage device 100 and the side member 400.

In the above-mentioned embodiment, the energy storage apparatus 10 does not need to include all the constituent elements shown in FIG. 2. The energy storage apparatus 10 does not need to include the end member 300, the bus bar holding member 500, or the substrate 700.

A mode constructed by optionally combining the constituent elements included in the above embodiment and the above modification example is also included in the scope of the present invention.

The present invention can be realized not only as the energy storage apparatus 10 but also as the spacer 200 included in the energy storage apparatus 10.

INDUSTRIAL APPLICABILITY

The present invention can be applied to an energy storage apparatus or the like including an energy storage device such as a lithium ion secondary battery.

DESCRIPTION OF REFERENCE SIGNS

- 10: energy storage apparatus
- 100: energy storage device
- 110: case
- 110a: case protruding portion
- 111: long side surface protruding portion
- 112: short side surface protruding portion
- 120: case main body
- 121: long side surface portion
- 122: short side surface portion
- 123: bottom surface portion
- 130: lid body (upper surface portion)
- 131: gas release valve
- 132: electrolyte solution filling unit
- 140: electrode terminal
- 150: gasket
- 200: spacer
- 210: spacer main body portion
- 220: spacer side wall portion
- 221: first abutting portion
- 222: second abutting portion
- 223: first spacer protruding portion
- 224: third abutting portion
- 225: second spacer protruding portion
- 300: end member
- 400, 400a, 400b: side member
- 410: side main body portion
- 420, 430: side connection portion
- 420a, 430a: through hole
- 440: first side protruding portion
- 450: second side protruding portion
- 460: joining member
- 500: bus bar holding member
- 600: bus bar
- 610: external terminal
- 700: substrate
- 710: wiring

The invention claimed is:

1. An energy storage apparatus comprising:
an energy storage device including a case;
a spacer including a spacer main body portion arranged on a first side in a first direction of the energy storage device;
a side member including a side main body portion arranged on a first side in a second direction intersecting the first direction of the energy storage device;
a bus bar which is arranged on the energy storage device; and
a bus bar holding member which hold the bus bar,
wherein the energy storage device includes an electrode terminal which protrudes from the case to a first side in a third direction which intersects the first direction and the second direction,
wherein the side member includes a first side protruding portion which protrudes from the side main body portion to a second side in the second direction toward the electrode terminal, and
wherein the spacer includes a first spacer protruding portion which is arranged between the electrode terminal and the first side protruding portion and protrudes from the spacer main body portion to the first side in the third direction further than at least one of the electrode terminal and the first side protruding portion.

2. The energy storage apparatus according to claim 1, wherein
the side member further includes a second side protruding portion arranged so that the case is sandwiched between the second side protruding portion and the first side protruding portion, the second side protruding portion protruding from the side main body portion to the second side in the second direction, and
the spacer further includes a second spacer protruding portion arranged on the second side in the second direction of the second side protruding portion, the second spacer protruding portion protruding from the spacer main body portion to a second side in the third direction.

3. The energy storage apparatus according to claim 1, wherein the case includes a case protruding portion arranged on the second side in the third direction of the first side protruding portion, the case protruding portion protruding to the first side in the second direction.

4. The energy storage apparatus according to claim 3, wherein the spacer further includes a first abutting portion arranged between the first side protruding portion and the case protruding portion and on which the case protruding portion abuts in the third direction.

5. The energy storage apparatus according to claim 3, wherein the spacer further includes a second abutting portion arranged between the side main body portion and the case protruding portion and on which the case protruding portion abuts in the second direction.

6. The energy storage apparatus according to claim 1, wherein the spacer further includes a stepped portion.

7. The energy storage apparatus according to claim 1, further comprising a substrate for monitoring a charged state or a discharged state of the energy storage device.

8. An energy storage apparatus comprising:
an energy storage device including a case;
a spacer including a spacer main body portion arranged on a first side in a first direction of the energy storage device;
a side member including a side main body portion arranged on a first side in a second direction intersecting the first direction of the energy storage device; and
a substrate for monitoring a charged state or a discharged state of the energy storage device,
wherein the energy storage device includes an electrode terminal which protrudes from the case to a first side in a third direction which intersects the first direction and the second direction,
wherein the side member includes a first side protruding portion which protrudes from the side main body portion to a second side in the second direction toward the electrode terminal, and wherein the spacer includes a first spacer protruding portion which is arranged between the electrode terminal and the first side protruding portion and protrudes from the spacer main body portion to the first side in the third direction further than at least one of the electrode terminal and the first side protruding portion.

9. The energy storage apparatus according to claim 8, wherein the side member further includes a second side protruding portion arranged so that the case is sandwiched between the second side protruding portion and the first side protruding portion, the second side protruding portion protruding from the side main body portion to the second side in the second direction, and
wherein the spacer further includes a second spacer protruding portion arranged on the second side in the second direction of the second side protruding portion, the second spacer protruding portion protruding from the spacer main body portion to a second side in the third direction.

10. The energy storage apparatus according to claim 8, wherein the case includes a case protruding portion arranged on the second side in the third direction of the first side protruding portion, the case protruding portion protruding to the first side in the second direction.

11. The energy storage apparatus according to claim 10, wherein the spacer further includes a first abutting portion arranged between the first side protruding portion and the case protruding portion and on which the case protruding portion abuts in the third direction.

12. The energy storage apparatus according to claim 10, wherein the spacer further includes a second abutting portion arranged between the side main body portion and the case protruding portion and on which the case protruding portion abuts in the second direction.

13. The energy storage apparatus according to claim 8, wherein the first spacer protruding portion protrudes from the spacer main body portion to the first side in the third direction further than both of the electrode terminal and the first side protruding portion.

14. An energy storage apparatus comprising:
an energy storage device including a case;
a spacer including a spacer main body portion arranged on a first side in a first direction of the energy storage device; and
a side member including a side main body portion arranged on a first side in a second direction intersecting the first direction of the energy storage device,
wherein the energy storage device includes an electrode terminal which protrudes from the case to a first side in a third direction which intersects the first direction and the second direction, wherein the side member includes a first side protruding portion which protrudes from the side main body portion to a second side in the second direction toward the electrode terminal,
wherein the spacer includes a first spacer protruding portion which is arranged between the electrode terminal and the first side protruding portion and protrudes from the spacer main body portion to the first side in the third direction further than at least one of the electrode terminal and the first side protruding portion,
wherein the side member further includes a second side protruding portion arranged so that the case is sandwiched between the second side protruding portion and the first side protruding portion, the second side protruding portion protruding from the side main body portion to the second side in the second direction, and
wherein the spacer further includes a second spacer protruding portion arranged on the second side in the second direction of the second side protruding portion, the second spacer protruding portion protruding from the spacer main body portion to a second side in the third direction.

15. The energy storage apparatus according to claim 14, wherein the case includes a case protruding portion arranged on the second side in the third direction of the first side protruding portion, the case protruding portion protruding to the first side in the second direction.

16. The energy storage apparatus according to claim 15, wherein the spacer further includes a first abutting portion arranged between the first side protruding portion and the case protruding portion and on which the case protruding portion abuts in the third direction.

17. The energy storage apparatus according to claim 15, wherein the spacer further includes a second abutting portion arranged between the side main body portion and the case protruding portion and on which the case protruding portion abuts in the second direction.

18. The energy storage apparatus according to claim 14, wherein the spacer further includes a stepped portion.

19. The energy storage apparatus according to claim 7, wherein the substrate is mounted to the bus bar holding member.

20. The energy storage apparatus according to claim 1, wherein the first spacer protruding portion protrudes from the spacer main body portion to the first side in the third direction further than both of the electrode terminal and the first side protruding portion.

* * * * *